3,036,082
CERTAIN ESTERS OF CERTAIN ALPHA-(PYRIDYL METHYL), ALPHA - PHENYL, 3 - TERT - AMINO-PROPANOLS AND RELATED COMPOUNDS
Charles Ferdinand Huebner, Chatham, N.J., assignor to Ciba Corporation, a corporation of Delaware
No Drawing. Filed May 8, 1959, Ser. No. 811,814
10 Claims. (Cl. 260—295)

The present invention concerns tertiary amines. More particularly, it relates to esters of 3-tertiary aminopropanols of the formula:

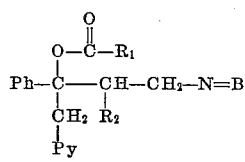

in which $R_1$ represents a lower alkoxy group or an aliphatic hydrocarbon, Ph stands for a monocyclic carbocyclic aryl radial, Py for a pyridyl radical, $R_2$ for hydrogen or lower alkyl, and the group —N=B represents an N,N-di-lower alkyl-amino group, an N,N-lower alkyleneimino, an N,N-lower azaalkylene-imino or an N,N-lower oxaalkylene-imino group, the salts and quaternary ammonium compounds thereof, as well as process for the preparation of such compounds.

$R_1$, when standing for lower alkoxy, e.g. methoxy or ethoxy, forms together with the carbonyl group the acyl radical of a lower alkoxy carbonic acid. The lower aliphatic hydrocarbon group is represented primarily by lower alkyl, e.g. methyl, n-propyl, isopropyl, n-butyl, isobutyl, or particularly ethyl, or may also stand for lower alkenyl, e.g. vinyl or methylvinyl. Substituted lower aliphatic hydrocarbon radicals, such as tertiary amino-lower alkyl, e.g. 2-dimethylaminoethyl or 2-diethylaminoethyl, lower alkoxy-lower alkyl, e.g. 2-methoxy-ethyl, or halogen-lower alkyl, e.g. chloromethyl, bromomethyl, dichloromethyl or 2-chloroethyl, are included as well.

The monocyclic carbocyclic aryl radical represents phenyl or substituted phenyl; halogen, e.g. fluorine, chlorine or bromine, lower alkyl, e.g. methyl or ethyl, lower alkoxy, e.g. methoxy or ethoxy, nitro, amino, particularly di-lower alkylamino, e.g. dimethylamino, are suitable substituents, which may be located in any position of the phenyl ring.

The pyridyl radical is particularly a 2-pyridyl radical; also included in the scope of the invention are 4-pyridyl and 3-pyridyl radicals. These radicals are preferably unsubstituted; possible substituents are lower alkyl, e.g. methyl or ethyl, groups.

The radical $R_2$ stands for hydrogen or lower alkyl, e.g. ethyl, or particularly methyl.

The N,N-di-lower alkyl-amino group, represented by the symbol —N=B, stands primarily for dimethylamino; diethylamino and N-ethyl-N-methylamino are also anticipated, as well as N-lower alkyl-N-cycloalkyl-amino, in which cycloalkyl contains from 5 to 6 carbon atoms, e.g. N-cyclopentyl-N-methyl-amino or N-cyclohexyl-N-methyl-amino. An N,N-lower alklene-imino group, in which the lower alkylene portion contains from 4 to 6 chain carbon atoms, is particularly a pyrrolidino, piperidino or hexamethyleneimino group. N,N-lower azaalkyleneimino groups are represented, for example, by $N^4$-lower alkyl-piperazino groups, e.g. $N^4$-methyl-piperazino, or $N^4$-hydroxy-lower alkyl-piperazino, e.g. $N^4$-(2-hydroxyethyl)-piperazino, or $N^4$-acyloxy-lower alkyl-piperazino, e.g. $N^4$-(2-acetyloxyethyl)-piperazino, and N,N-lower oxaalkylene-imino groups may be morpholino groups, e.g. morpholino.

The present compounds may be in the form of mixtures of racemates, single racemates or antipodes depending on the number of asymmetric carbon atoms present in the molecule and the stereospecificity of the process of manufacture.

Salts of the compounds of this invention are particularly therapeutically acceptable acid addition salts with inorganic acids, such as hydrohalic acids, e.g. hydrochloric or hydrobromic acid; sulfuric or phosphoric acids; or with organic acids, such as acetic, propionic, glycolic, succinic, maleic, hydroxymaleic, dihydroxymaleic, fumaric, malic, tartaric, citric, benzoic, salicylic, 4-aminosalicyclic, 2-phenoxybenzoic, 2-acetoxy-benzoic, methane sulfonic, ethane sulfonic or hydroxy-ethane sulfonic acid. Salts which are primarily used for identification purposes are particularly those with acidic organic nitro compounds, e.g. picric, picrolonic or flavianic acid, or with metal complex acids, e.g. phosphotungstic, phosphomololybdic, chloroplatinic or Reinecke acid. Mono or poly-salts may be formed depending on the procedure used for the preparation of the salts and the number of salt-forming groups.

Non-toxic quaternary ammonium derivatives of the compounds of this invention are particularly the quaternary ammonium salts with reactive esters formed by hydroxylated compounds with strong acids, especially mineral acids. Such esters are those of lower alkanols, for example, lower alkyl halides, e.g. methyl chloride, methyl bromide, methyl iodide, or the corresponding ethyl, propyl or isopropyl halides; or alkyl lower alkane sulfonates, e.g. methyl or ethyl methane or ethane sulfonate. Also included as non-toxic quaternary ammonium compounds are the quaternary ammonium hydroxides, and the salts obtained by reacting such quaternary ammonium hydroxides with inorganic, or particularly with organic acids, such as with acids described hereinbefore as being suitable for the preparation of the therapeutically acceptable acid addition salts. Mono- or poly-quaternary ammonium compounds may be formed, depending on the conditions of their formation and the number of tertiary nitrogen atoms.

The present compounds have analgetic properties and are intended to be used as analygetics having improved characteristics; for example, they are remarkably free from side effects generally associated with analgetics. The new compounds may, therefore, be used both in animals and humans to raise the threshold of pain, which function is of particular importance in post-operative states after minor or major surgery, in states of chronic pains, such as headaches, or those caused by arthritic diseases. Particularly outstanding analgetic effects are associated with compounds of the formula:

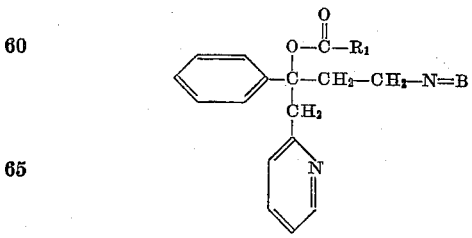

in which $R_1$ represents lower alkyl, particularly ethyl, and the grouping —N=B stands for N,N-di-lower alkyl-amino, and especially with compounds of the formula:

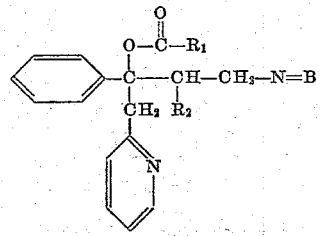

in which $R_1$ represents lower alkyl, particularly ethyl, $R_2$ stands for lower alkyl, particularly methyl, and the grouping —N=B for N,N-di-lower alkyl-amino, and the salts of these compounds with mineral acids, e.g. hydrochloric, sulfuric or phosphoric acid, or with polybasic organic carboxylic acids, such as, for example, unsaturated dicarboxylic acids, e.g. maleic acid, or hydroxylated polybasic carboxylic acids, e.g. tartaric or citric acid. Pronounced analgetic properties are also shown by those compounds in which the grouping —N=B represents pyrrolidino.

Although good analgetic activity can already be observed in resulting mixtures of racemates, the single racemates or the antipodes exert more advantageous analgetic effects and are, therefore, the preferred forms.

The compounds of this invention may be used as medicaments in the form of pharmaceutical preparations, which contain the new tertiary amines, the salts or the quaternary ammonium compounds thereof in admixture with a pharmaceutical organic or inorganic, solid or liquid carrier suitable for enteral, e.g. oral, or parenteral administration. For making up the preparations there can be employed substances which do not chemically react with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier for medicaments. The pharmaceutical preparations may be in the solid form, for example, as capsules, tablets or dragees, or in liquid form, for example, as solutions, suspensions or emulsions. If desired, they may contain auxiliary substances, such as, for example, preserving agents, stabilizing agents, wetting or emulsifying agents, salts for varying the osmotic pressure or buffers. They may also contain, in combination, other therapeutically useful substances.

The compounds of this invention may be prepared by esterifying an alcohol of the formula:

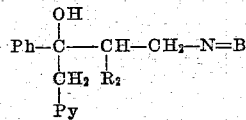

in which $R_2$, Py and Ph, as well as the grouping —N=B have the above-described meaning, in the form of a mixture of racemates, a racemate or an antipode thereof, with an acid of the formula $R_1$—COOH, in which $R_1$ has the above-given meaning, used in the form of a reactive functional derivative thereof or of a ketene thereof, and, if desired, converting a resulting salt into the free base, and/or, if desired, converting a resulting base into a salt or a quaternary ammonium compound thereof, and/or, if desired, separating a resulting mixture of racemates into the single racemates, and/or, if desired, resolving a resulting racemate into the antipodes.

The esterification procedure may be carried out according to known methods; for example, the alcohol is treated with the reactive functional derivative of an acid of the formula $R_1$—COOH. This reaction may be performed in the presence of a basic reagent, primarily an organic base, for example, a tertiary amine, such as a tri-lower alkyl-amine, e.g. trimethylamine, N,N-dimethyl-N-ethyl-amine, N,N-diethyl-N-methyl-amine, triethylamine, N-benzyl-N,N-dimethyl-amine, or N,N-dimethylaniline, or equivalent amines, or a heterocyclic tertiary base, e.g. pyridine, collidine, or equivalent compounds. These liquid bases may also serve as solvents, or other solvents may be added, such as, for example, aromatic hydrocarbons, e.g. benzene, toluene or xylene, aliphatic hydrocarbons, e.g. pentane or hexane, or ethers, e.g. diethyl ether. Reactive functional derivatives of acids capable of forming ester groupings are primarily acid anhydrides, which are preferably used in the presence of a tertiary amine, or particularly, a heterocyclic base, e.g. pyridine.

The esterification may also be accomplished by reacting the alcohol with the anhydride of an acid of the formula $R_1$—COOH, in which $R_1$ has the above-given meaning, in the presence of an acid instead of a base; for example, sulfuric acid or perchloric acid may be utilized, preferably in catalytic amounts.

Additional esterification reagents are ketenes; upon treatment with water such ketenes would yield acids of the formula $R_1$—COOH, in which $R_1$ represents lower alkyl. Such ketenes are, for example, ketene itself, or methyl-ketene or other substituted ketenes, which furnish an acetyl, a propionyl radical or other substituted acetyl radicals. Such reaction is performed in an inert solvent, such as an aromatic hydrocarbon, e.g. toluene.

Acid halides, particularly acid chlorides, may also be used as esterifying reagents. Whereas acid chlorides of alkanone acids containing from two to three carbon atoms, e.g. acetic or propionic acid, may lead to some dehydration of the tertiary alcohol, those of lower alkoxycarbonic acids, e.g. ethoxycarbonic acid, or of alkanoic acids containing more than three carbon atoms, e.g. butyric or valeric acid, may be useful in the esterification of the present invention. Pyridine or other inert liquids may be useful as solvents.

The reaction may be performed under cooling, at room temperature or, though less frequently, at an elevated temperature. If necessary, the atmosphere of an inert gas, e.g. nitrogen, may be required.

The products of the esterification procedure are isolated by working up the reaction mixture according to known methods, such as extraction, absorption and elution (column chromatography, paper chromatography), distillation, crystallization, etc., and are purified by distillation, recrystallization, etc.

The starting materials and the salts thereof, as well as any quaternary ammonium compounds formed therefrom, are new and are intended to be included within the scope of this invention. As previously demonstrated, they are converted to useful analgetic compounds by esterification with a reactive functional derivative of an acid of the formula $R_1$—COOH, in which $R_1$ has the above-given meaning. These intermediates, having the formula:

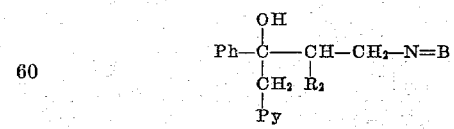

in which $R_2$, Ph, Py and the grouping —N=B have the above-given meaning, and the salts thereof, may advantageously be prepared by reacting a ketone of the formula:

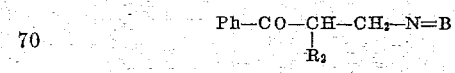

in which $R_2$, Ph and the grouping —N=B have the above-given meaning, with a pyridyl-methyl alkali metal compound or a pyridyl-methyl Grignard compound, and, if desired, carrying out the optional steps previously mentioned.

Pyridyl-methyl alkali metal compounds are the sodium or primarily the lithium compounds, which may be prepared, for example, by treating a picoline, i.e. an α-picoline or γ-picoline, with a phenyl alkali metal compound, e.g. phenyl lithium, or a lower alkyl alkali metal compound, e.g. butyl lithium. An alkali metal or an alkali metal amide, e.g. lithium or sodium amide, in liquid ammonia or in an inert solvent, e.g. toluene, may be used as well. An excess of the pyridine compound may also be used instead of an additional solvent. The reaction with the ketone may be carried out in the presence of an inert solvent, for example, an ether, e.g. diethylether, or an aromatic hydrocarbon, e.g. benzene or toluene. Cooling may be required, but the reaction may be performed at room temperature or, if necessary, at an elevated temperature, and is advantageously carried out in the atmosphere of an inert gas, e.g. nitrogen.

Pyridyl-methyl Grignard reagents are reacted with the ketone under analogous conditions as the corresponding alkali metal derivatives; such reagents are particularly pyridyl-methyl magnesium halides, e.g. chlorides or bromides. A resulting Grignard complex is decomposed, for example, with water, or preferably wtih aqueous solutions of ammonium salts, e.g. ammonium chloride, etc. The products are then worked up as previously mentioned.

The compounds of this invention are obtained in the form of the free bases or as the salts thereof. A salt may be converted into the free base, for example, by reaction with an alkaline reagent, such as an aqueous alkali metal hydroxide, e.g. lithium, sodium or potassium hydroxide; an aqueous alkali metal carbonate, e.g. sodium carbonate or potassium hydrogen carbonate; or aqueous ammonia. A free base may be converted into its therapeutically useful acid additions salts by reaction with one of the inorganic or organic acids outlined hereinbefore, for example, by treating a solution of the base in a lower alkanol, e.g. methanol, ethanol, propanol or isopropanol, or in another appropriate solvent or a mixture of solvents with the acid or a solution thereof. Mono- or poly-salts may be formed depending on the conditions of the salt-formation and/or the number of salt-forming groups. The salts may also be obtained as the hemihydrates, monohydrates, sesquihydrates or polyhydrates depending on the conditions used in the formation of the salts.

Non-toxic quaternary ammonium derivatives of the compounds of this invention may be obtained, for example, by reacting the tertiary base with an ester formed by a hydroxylated lower hydrocarbon compound and a strong inorganic or organic acid. These esters are specifically lower alkyl halides, e.g. methyl, ethyl or propyl chloride, bromide or iodide, or lower alkyl lower alkane sulfonates, e.g. methyl or ethyl methane sulfonate or ethane sulfonate. The quaternizing reactions may be performed in the presence of a solvent; suitable solvents are more especially lower alkanols, e.g. methanol, ethanol, propanol, isopropanol, butanol, or pentanol; lower alkanones, e.g. acetone or methyl ethyl ketone; or organic acid amides, e.g. formamide or dimethylformamide. Pressure and/or the atmosphere of an inert gas may be required.

Resulting quaternary ammonium compounds may be converted into the corresponding quaternary ammonium hydroxides, for example, by reacting a quaternary ammonium halide with silver oxide or a quaternary ammonium sulfate with barium hydroxide, by treating a quaternary ammonium salt with an anion exchanger, or by electro-dialysis. From a resulting quaternary ammonium base there may be prepared therapeutically suitable quaternary ammonium salts by reaction wtih acids, for example, with those outlined hereinbefore for the preparation of the acid addition salts. A a quaternary ammonium compound may also be converted directly into another quaternary ammonium salt without the formation of the quaternary ammonium hydroxide; for example, a quaternary ammonium iodide may be reacted with freshly prepared silver chlordie to yield the quaternary ammonium chloride, or a quaternary ammonium iodide may be converted into the corresponding chloride by treatment with hydrochloric acid in anhydrous methanol. Quaternary ammonium compounds may also crystallize as the hydrates; mono- or poly-quaternary ammonium compounds may be formed depending on the conditions of the quaternizing reaction and/or the number of tertiary amino groups present in the molecule.

Depending on the number of asymmetric carbon atoms, the procedure for their preparation and the choice of starting materials, the new compounds of this invention, i.e. the esters, as well as the tertiary alcohols used as the starting materials, may be obtained in the form of mixtures of racemates, single racemates or antipodes. A mixture of racemates or the salts thereof may be separated into the single racemates on the basis of physico-chemical differences. For example, a crystalline racemate may be separated from a non-crystalline racemate, or differences in solubility may be exploited in fractional crystallization procedures.

Racemates may be resolved into the optically active antipodes according to procedures known for the resolution of racemic compounds. For example, to the free base of a racemic, d, l-compound, dissolved in a solvent, such as a lower alkanol, e.g. methanol or ethanol, may be added one of the optically active forms of an acid containing an asymmetric carbon atom, or a solution thereof, for example, in the same lower alkanol or in water or in a mixture of such solvents; a salt may then be isolated, which is formed by the optically active acid with one of the optically active forms of the base. Especially useful as optically active forms of salt forming acids have an asymmetric carbon atom are D- and L-tartaric acid; the optically active forms of malic, mandelic, camphor sulfonic or quinic acid may also be employed. From this salt, the free and optically active base may be obtained according to processes known for the conversion of a salt into a base, for example, as outlined hereinbefore. An optically active base may be converted into a therapeutically useful acid addition salt with one of the acids mentioned hereinbefore, or may be converted into a non-toxic quaternary ammonium compound. The optically active forms may also be isolated by biochemical methods.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

This is a continuation-in-part of my application Serial No. 794,853, filed February 24, 1959, which in turn is a continuation-in-part of my application Serial No. 782,405, filed December 23, 1958, both now abandoned.

The following examples are intended to illustrate the invention and are not to be construed as being limitations thereon. Temperatures are given in degrees centigrade.

*Example 1*

A mixture of 3 g. of 4-dimethylamino-2-phenyl-1-(2-pyridyl)-2-butanol, 3 g. of propionic acid anhydride and 3 ml. of pyridine is allowed to stand at room temperature for one week. The solvent is removed under reduced pressure, the residue is diluted with water, the solution is made basic with aqueous ammonia and then extracted with ether. The ether portion is separated, washed and evaporated to yield the non-crystalline 2-(4-dimethylamino-2-phenyl - 2 - propionyloxy - 1 - butyl)-pyridine, having an infrared carbonyl absorption at 1732 cm.$^{-1}$.

An aqueous solution of the corresponding hydrochloride may be prepared by treating the free base of 2-(4-dimethylamino-2-phenyl - 2 - propionyloxy - 1 - butyl)-pyridine with equimolar amount of aqueous hydrochloric acid.

The starting material may be prepared as follows: To 0.34 mol of phenyl lithium (prepared from 6.2 g. of lithium and 69 g. of bromobenzene) is added dropwise 31.6 g. of α-picoline. After stirring for 3 hours, an ether solution of 20 g. of β-dimethylamino-propionphenone is is added while stirring, and the reaction mixture is allowed to stand at room temperature overnight. After filtration, the filtrate is treated with water, the organic material is taken up in ether, which solution in turn is extracted with 15% aqueous hydrochloric acid. The acidic layer is made basic with aqueous ammonia and the organic base is extracted with ether. The ether layer is dried, evaporated and the residue is distilled to yield the 4 - dimethylamino-2-phenyl-1-(2-pyridyl) - 2 - butanol, B.P. 125–145°/0.4 mm.; yield: 9 g.

The corresponding maleate, prepared by treatment with maleic acid in ethanol, melts at 130°; the methiodide, resulting from the reaction of the base with methyl iodide, methanol has a melting point of 198–199°.

Example 2

A mixture of 3 g. of 4-dimethylamino-3-methyl-2-phenyl-1-(2-pyridyl)-2-butanol, 3 ml. of propionic acid anhydride and 3 ml. of pyridine is allowed to stand at room temperature for two weeks. After evaporation of the pyridine, the residue is diluted with water, the solution is made basic with aqueous ammonia and then extracted with ether. The ether layer is separated, the solvent is evaporated to yield 0.75 g. of a material having a relatively broad carbonyl absorption in the infrared spectrum of 1730 cm.$^{-1}$.

After standing for three days, a crystalline material forms which is separated from the oily material by filtration. The crystalline product represents a racemate of 2-(4-dimethylamino - 3 - methyl - 2 - phenyl - 2 - propionyloxy-1-butyl)-pyridine, designated as the α-racemate of this compound; it melts at 90–91° after being recrystallized from ether. Its infrared absorption spectrum shows a sharp carbonyl absorption at 1750 cm.$^{-1}$.

The starting material may be prepared as follows: A mixture of 224 g. of propio-phenone, 176 g. of dimethylamine hydrochloride, 66 g. of paraformaldehyde, 3.33 ml. of hydrochloric acid and 266 ml. of ethanol is refluxed for two hours. After evaporation of the ethanol, water is added and the water-insoluble material is extracted with ether. The aqueous layer is made basic with aqueous ammonia and the organic base is extracted with ether. The ether is washed, dried and evaporated to yield 149 g. of β-dimethylamino-α-methyl-propionphenone.

To 0.5 mol of phenyl lithium, prepared from 9.1 g. of lithium and 67.5 g. of bromobenzene, is added dropwise, while stirring and in a nitrogen atmosphere, 49 ml. of α-picoline and after three hours 31.9 g. of β-dimethylamino-α-methyl-propiophenone. After standing overnight at room temperature the excess lithium is filtered off, the filtrate is poured into ice-water and the mixture extracted with ether. The ether layer is washed, dried and evaporated; the residue is distilled, 150–160°/0.6 mm., to yield 69 g. of 4-dimethylamino-3-methyl-2-phenyl-1-(2-pyridyl)-2-butanol.

Upon resolution of the α-racemate of 2-(4-dimethylamino-3-methyl - 2 - phenyl - 2 - propionyloxy-1-butyl)-pyridine, for example, according to the procedure described hereinbefore, the optically active α$_1$- and α$_2$-antipodes of 2-(4-dimethylamino - 3 - methyl - 2 - phenyl-2-propionyloxy-1-butyl)-pyridine, if desired, in the form of a salt with an acid, can be obtained.

Instead of using propionic acid anhydride, other carboxylic acid anhydrides, such as acetic acid anhydride, may be used.

Example 3

A mixture of 5 g. of the non-crystalline, oily α-racemate of 3 - methyl - 2 - phenyl - 1 - (2-pyridyl)-4-(1-pyrrolidino)-2-butanol, 5 ml. of pyridine and 5 ml. of propionic acid anhydride is allowed to stand at room temperature for two days. The solvent is removed under reduced pressure and the residue is diluted with water and then made basic with aqueous ammonia. The organic material is extracted with ether, the ether phase is washed with water, dried over sodium sulfate and evaporated. The non-crystalline residue, representing the α-racemate of 2-[3 - methyl - 2 - phenyl - 2 - propionyloxy-4-(1-pyrrolidino)-1-butyl]-pyridine, shows in the IR-absorption spectrum a characteristic ether band at 1735 cm.$^{-1}$.

The free base may be converted into an aqueous solution of the hydrochloride by dissolving the α-racemate of 2-[3 - methyl - 2 - phenyl - 2 - propionyloxy - 4 - (1-pyrrolidino)-butyl]-pyridine in the stoichiometric amount of aqueous hydrochloric acid.

The starting material may be prepared as follows: To an ether solution of 0.64 mol of phenyl lithium (prepared from 9.1 g. of lithium and 101 g. of bromobenzene) is added dropwise while stirring and under an atmosphere of dry nitrogen 0.64 mol of α-picoline. After stirring for two hours at room temperature, the reaction mixture is cooled in an ice bath and 0.52 mol (113 g.) of 2-methyl-1-phenyl-3-(1-pyrrolidino)-1-propanone is given to the reagent solution. A precipitate forms which is dissolved upon adding more ether. Immediately after completion of the addition of the ketone the reaction mixture is poured into ice-water; the ether layer is separated, washed with water, dried over sodium sulfate and evaporated. Upon standing the residue crystallizes partially, ether is added, the crystalline β-racemate of 3-methyl-2-phenyl-1-(2-pyridyl)-4-(1-pyrrolidino) - 2 - butanol is filtered off and washed with a minimum amount of water, M.P. 85°; yield: 20 g.

The filtrate is evaporated under reduced pressure to remove all traces of ether and yields 90 g. of the non-crystalline, oily α-racemate of 3-methyl-2-phenyl-1-(2-pyridyl)-4-(1-pyrrolidino)-2-butanol.

Example 4

By bubbling freshly generated ketene through a solution of 1 g. of 4-dimethylamino-2-phenyl-1-(2-pyridyl)-2-butanol in benzene and working up the reaction mixture as described in Example 1 the racemate of 2-(2-acetoxy-4-dimethylamino-2-phenyl-1-butyl)-pyridine can be obtained and resolved into the antipodes.

Example 5

Treatment of 2-(4-chloro-phenyl)-4-dimethylamino-3-methyl-1-(2-pyridyl)-2-butanol in pyridine with propionic acid anhydride according to the procedure given in Examples 1 to 3 yields the 2-[2-(4-chloro-phenyl)-4-dimethylamino-3-methyl-2-propionyloxy-1-butyl] - pyridine, which may be separated into its α- and β-racemate on the basis of their physico-chemical differences.

The starting material may be prepared by treating an ethanol solution of 1-(4-chloro-phenyl)-1-propanone with dimethylamine hydrochloride and paraformaldehyde in the presence of hydrochloric acid and reacting the resulting 1-(4-chloro-phenyl)-3-dimethylamino-2-methyl-1-propanone with the 2-methyl-pyridine lithium compound as shown in Example 2.

Other compounds, which may be obtained according to the above-described procedure using appropriate starting materials are, for example, 2-[2-(3,4-dichlorophenyl) - 4 - dimethylamino - 3 - methyl - 2 - propionyloxy - 1 - butyl] - pyridine, 2 - [3 - methyl - 4 - (1 - morpholino) - 2 - phenyl - 2 - propionyloxy - 1 - butyl] - pyridine, 2 - [4 - diethylamino - 2 - (4 - methoxy - phenyl)-2-propionyloxy-1-butyl]-pyridine or 2-[4-dimethylamino-2- phenyl - 2 - propionyloxy - 1 - butyl] - 6 - methyl - pyridine, and the like.

The starting materials used in the procedure of the invention may also be prepared by reacting a ketone of the formula:

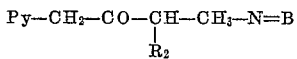

in which $R_2$, Py and the grouping —N=B have the previously given meaning, with a monocyclic carbocyclic aryl Grignard reagent, and, if desired, carrying out the optional steps.

A monocyclic carbocyclic aryl Grignard reagent is primarily a monocyclic carbocyclic aryl magnesium halide, in which the halide stands particularly for bromide. The reaction is carried out under conditions used in the Grignard reaction. Solvents are, for example, those used for the preparation of the reagent, such as di-lower alkyl ether, e.g. diethyl ether, or other ethers, e.g. anisole or tetrahydrofurane, tertiary bases, e.g. pyridine, or aromatic hydrocarbons, e.g. benzene or toluene. If necessary, cooling or heating may be applied, and/or, the reaction may be performed in the atmosphere of an inert gas. A resulting complex may be broken up, for example, by addition of aqueous ammonium chloride. The starting material used in this procedure may be prepared, for example, by reacting a picoline, e.g. α-picoline or γ-picoline, with an ester, such as a lower alkyl, e.g. methyl, ester or an acid halide, e.g. chloride, of an acid of the formula:

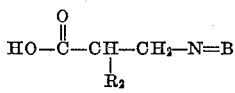

in which $R_2$ and the grouping —N=B have the previously given meaning, in the presence of an alkali metal, e.g. sodium, in liquid ammonia.

Instead of separating resulting racemates after the preparation of the final products, i.e. the esters, the starting materials, i.e. the alcohols, or any intermediates for the preparation of the starting materials may be separated into racemates and/or racemates thereof may be resolved into the antipodes; the final products or the alcohols used as the starting materials may thus be obtained in the form of their racemates and/or antipodes.

What is claimed is:
1. A member of the group consisting of a compound of the formula:

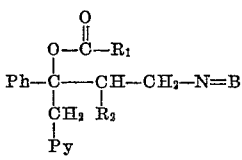

in which $R_1$ is a member of the group consisting of lower alkoxy and lower alkyl, $R_2$ is a member of the group consisting of hydrogen and lower alkyl, Ph stands for a member selected from the group consisting of phenyl, halogeno-phenyl, lower alkyl-phenyl, lower alkoxy-phenyl and di-lower alkyl-amino-phenyl, Py for a member selected from the group consisting of pyridyl and lower alkyl-pyridyl, and the grouping —N=B for a member of the group consisting of N,N-di-lower alkyl-amino, pyrrolidino, piperidino, hexamethyleneimino, $N^4$-lower alkyl-piperazino, $N^4$-hydroxy-lower alkyl-piperazino, $N^4$-acetoxy-lower alkyl-piperazino and morpholino, a therapeutically acceptable acid addition salt thereof, and a lower alkyl quaternary ammonium salt thereof.

2. A compound of the formula:

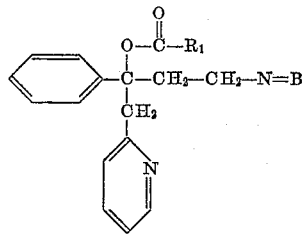

in which $R_1$ stands for lower alkyl and the grouping —N=B is N,N-di-lower alkyl-amino.

3. 2 - (4 - dimethylamino - 2 - phenyl - 2 - propionyloxy-1-butyl)-pyridine.

4. A compound of the formula:

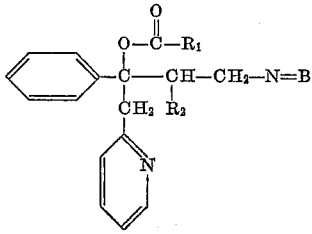

in which each of the radicals $R_1$ and $R_2$ is lower alkyl, and the grouping —N=B stands for N,N-di-lower alkyl-amino.

5. 2 - (4 - dimethylamino - 3 - methyl - 2 - phenyl - 2-propionyloxy-1-butyl)-pyridine.

6. The racemate of 2-(4-dimethylamino-3-methyl-2-phenyl-2-propionyloxy-1-butyl)-pyridine, melting at about 85° centigrade.

7. An optically active antipode obtained by resolution of the racemate of 2-(4-dimethylamino-3-methyl-2-phenyl-2-propionyloxy-1-butyl)-pyridine, melting at about 85° centigrade.

8. A compound of the formula:

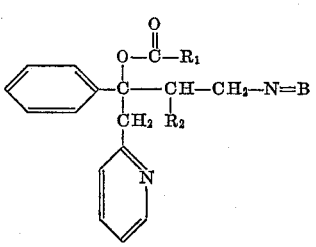

in which each of the radicals $R_1$ and $R_2$ is lower alkyl and the grouping —N=B stands for pyrrolidino.

9. 2 - [3 - methyl - 2 - phenyl - 2 - propionyloxy - 4 - (1-pyrrolidino)-1-butyl]-pyridine.

10. The racemate of 2-[3-methyl-2-phenyl-2-propionyloxy-4-(1-pyrrolidino)-1-butyl]-pyridine, having an infrared absorption ester band at 1735 cm.$^{-1}$.

References Cited in the file of this patent
UNITED STATES PATENTS

| | | |
|---|---|---|
| 2,601,141 | Hoffman et al. | June 17, 1952 |
| 2,712,022 | Adamson | June 28, 1955 |
| 2,874,182 | Surrey | Feb. 17, 1959 |

FOREIGN PATENTS

| | | |
|---|---|---|
| 689,234 | Great Britain | Mar. 25, 1953 |